US012637539B2

(12) United States Patent (10) Patent No.: US 12,637,539 B2

Mieda et al. (45) **Date of Patent: *May 26, 2026**

(54) POLYESTER RESIN COMPOSITION, AQUEOUS DISPERSION, COATING COMPOSITION, AND COATING FILM

(71) Applicant: TOYOBO MC Corporation, Osaka (JP)

(72) Inventors: Hiroyuki Mieda, Shiga (JP); Katsuya Shimeno, Shiga (JP); Tadahiko Mikami, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 166 days.

This patent is subject to a terminal disclaimer.

(21) Appl. No.: 18/275,491

(22) PCT Filed: Feb. 3, 2022

(86) PCT No.: PCT/JP2022/004239

§ 371 (c)(1),
(2) Date: Aug. 2, 2023

(87) PCT Pub. No.: WO2022/168910

PCT Pub. Date: Aug. 11, 2022

(65) Prior Publication Data

US 2024/0110005 A1 Apr. 4, 2024

(30) Foreign Application Priority Data

Feb. 5, 2021 (JP) ................................. 2021-017776

(51) Int. Cl.
| | |
|---|---|
| *C08G 63/189* | (2006.01) |
| *B65D 65/42* | (2006.01) |
| *C08G 63/183* | (2006.01) |
| *C09D 5/02* | (2006.01) |
| *C09D 167/02* | (2006.01) |

(52) U.S. Cl.
CPC ........... *C08G 63/189* (2013.01); *B65D 65/42* (2013.01); *C08G 63/183* (2013.01); *C09D 5/02* (2013.01); *C09D 167/02* (2013.01)

(58) Field of Classification Search
CPC .... C08G 63/189; C08G 63/183; C08G 63/20; C08G 63/54; C08G 63/199; C08G 63/12; C08G 63/137; C08G 63/52; B65D 65/42; C09D 5/02; C09D 167/02; C09D 5/08; C09D 167/06; C08L 67/02
See application file for complete search history.

(56) References Cited

U.S. PATENT DOCUMENTS

| | | | |
|---|---|---|---|
| 7,030,197 B2 | 4/2006 | Morimoto et al. |
| 2002/0061959 A1 | 5/2002 | Kajimaru et al. |
| 2003/0083425 A1 | 5/2003 | Morimoto et al. |

| | | | |
|---|---|---|---|
| 2005/0176873 A1 | 8/2005 | Morimoto et al. |
| 2006/0149019 A1 | 7/2006 | Wamprecht et al. |
| 2015/0064378 A1 | 3/2015 | Kawakusu |
| 2015/0125643 A1 | 5/2015 | Takagi et al. |
| 2022/0169782 A1 | 6/2022 | Yamazaki et al. |
| 2024/0084127 A1 | 3/2024 | Mieda et al. |
| 2024/0124642 A1 | 4/2024 | Mieda et al. |

FOREIGN PATENT DOCUMENTS

| | | |
|---|---|---|
| CN | 104220483 | 12/2014 |
| CN | 106700044 | 5/2017 |
| CN | 113956472 | 1/2022 |
| JP | 52-151322 | 12/1977 |
| JP | 2001-81160 | 3/2001 |
| JP | 2002-173582 | 6/2002 |
| JP | 2003-89746 | 3/2003 |
| JP | 2006-169535 | 6/2006 |
| JP | 2007-277497 | 10/2007 |
| JP | 2008-7719 | 1/2008 |
| JP | 2008-239691 | 10/2008 |
| JP | 2013-710 | 1/2013 |
| JP | 2015-22292 | 2/2015 |
| JP | 2016-69627 | 5/2016 |
| JP | 2016-80861 | 5/2016 |
| JP | 2017-61620 | 3/2017 |
| JP | 2020-164735 | 10/2020 |
| JP | 2020-187341 | 11/2020 |
| WO | 2010/035822 | 4/2010 |
| WO | 2013/180067 | 12/2013 |

(Continued)

OTHER PUBLICATIONS

Office Action issued Apr. 9, 2025 in Taiwanese Patent Application No. 111104268, with English-language Translation.
Office Action issued Apr. 25, 2025 in Taiwanese Patent Application No. 111104262, with English-language Translation.
International Search Report issued Apr. 19, 2022 in International (PCT) Application No. PCT/JP2022/004240.
International Search Report issued Apr. 12, 2022 in International (PCT) Application No. PCT/JP2022/004239.
International Search Report issued Apr. 19, 2022 in International (PCT) Application No. PCT/JP2022/004241.
Extended European Search Report issued Oct. 25, 2024 in corresponding European Patent Application No. 22749783.1.
Office Action issued Feb. 8, 2025 in Taiwanese Patent Application No. 111104278, with English machine translation.

(Continued)

*Primary Examiner* — Michael C Miggins
(74) *Attorney, Agent, or Firm* — Wenderoth, Lind & Ponack, L.L.P.

(57) ABSTRACT

It is provided that a polyester resin and a polyester resin composition that allow reduction of harmful outgas and can form a coating film having excellent characteristics such as curability, retort resistance, and processability. A polyester resin composition comprising polyester resin (A), wherein the polyester resin composition satisfies the following requirements (i) to (iii), (i) the polyester resin (A) has an acid value of 100 eq/ton or more, (ii) the polyester resin composition substantially contains no curing agent, and (iii) a content of tetrahydrofuran-insoluble matter is 10 mass % or more when the polyester resin composition has been heated at 240° C. for one hour.

17 Claims, No Drawings

(56)  References Cited

FOREIGN PATENT DOCUMENTS

| | | |
|---|---|---|
| WO | 2022/168911 | 8/2022 |
| WO | 2022/168912 | 8/2022 |

OTHER PUBLICATIONS

Notice of Reasons for Refusal issued Nov. 11, 2025 in corresponding Japanese Patent Application No. 2022-534326, with English machine translation.
Japanese Office Action issued Nov. 11, 2025 in Japanese Patent Application No. 2022-534331, with English machine translation.
Japanese Office Action issued Nov. 11, 2025 in Japanese Patent Application No. 2022-534329, with English machine translation.
Notice of Reasons for Refusal issued Sep. 24, 2025 in Japanese Patent Application No. 2023-509208, with English language translation.
Office Action issued Jun. 20, 2025 in Chinese Patent Application No. 202280013121.2, with English translation.
Office Action issued Jul. 24, 2025 in Chinese Patent Application No. 202280013122.7, with English translation.
Office Action issued Jul. 24, 2025 in Chinese Patent Application No. 202280013126.5, with English translation.
International Search Report issued May 17, 2022 in International (PCT) Application No. PCT/JP2022/013259.
Extended European Search Report issued Feb. 21, 2025 in European Patent Application No. 22775613.7.
Taiwanese Office Action issued Apr. 14, 2025 in Taiwanese Patent Application No. 111110236, with English language translation.
The Office Action issued Nov. 28, 2025 in Chinese Patent Application No. 202280023125.9, with English machine translation.
Office Action issued Jan. 27, 2026 in Japanese Patent Application No. 2023-509208, with English machine Translation.
Office Action issued Mar. 6, 2026 in corresponding Chinese Patent Application No. 202280013121.2, with machine English-language translation.
Office Action issued Mar. 14, 2026 in Chinese Patent Application No. 202280013122.7, with machine English-language translation.
Office Action issued Mar. 17, 2026 in Chinese Patent Application No. 202280013126.5, with machine English-language translation.

POLYESTER RESIN COMPOSITION, AQUEOUS DISPERSION, COATING COMPOSITION, AND COATING FILM

TECHNICAL FIELD

The present invention relates to a polyester resin composition. Specifically, the present invention relates to a polyester resin composition suitable for a coating material of cans. More specifically, the present invention relates to a polyester resin composition suitable for covering inner surfaces of cans that store drinks and foods (hereinafter, collectively referred to as foods and drinks), an aqueous dispersion, a coating composition, and a coating film that contain the polyester resin composition, and a metal can having the coating film.

BACKGROUND ART

Metal cans such as drink cans and food cans have coatings formed of organic resins for preventing foods from causing corrosion of metals (corrosion resistance) and preventing degradation of flavor and relish of contents (flavor preservability). These coatings are required to have processability, corrosion resistance, adhesion to metal materials, curability, and the like. Furthermore, depending on usage, the coatings may be subjected to high-temperature high-humidity, conditions for retort-sterilization and the like. Also in such a case, the coating film is required to maintain adhesion to a metal material as a matter of course, and is also required to prevent blushing of the coating film particularly when the coating film is used for outer surface sides of metal lids and the like.

To date, as a coating material having the above described corrosion resistance, flavor preservability, and tolerance for withstanding a can forming process, an epoxy-based coating material such as an epoxy-phenol-based coating material, an epoxy-amino-based coating material, and an epoxy-acryl-based coating material, a polyester-based coating material such as a polyester-phenol-based coating material and a polyester-amino-based coating material, and a vinyl chloride-based coating material have been widely used. However, recent research reports that bisphenol A that is a material of an epoxy resin is likely to have an estrogen action and affect brains of fetuses and infants. Furthermore, a vinyl chloride-based coating material has a problem associated with a stabilizer and a problem that dioxin is generated during incineration. Formaldehyde, which is used as a material of phenol resin, amino resin, and the like and remains in a coating material, is known to be harmful to human bodies due to carcinogenicity and the like and adversely affect flavor preservability of contents. Moreover, there is a concern about influence on environmental pollution and work environment due to use of an organic solvent.

Because of such concerns about various adverse effects on human bodies, an aqueous coating material in which these materials are not used is commercially required. However, satisfactory performance cannot be obtained in practice as usage for cans.

From these viewpoints, as a resin composition for a metal container or a metal lid, for example, an aqueous coating composition in which an acrylic-modified polyester resin obtained by graft polymerization of a polymerizable unsaturated monomer component with polyester resin having an ethylene-based double bond at a resin end portion, and a β-hydroxyalkylamide crosslinking agent are dispersed in an aqueous medium, is suggested (Patent Literature 1).

Patent Literature 2 suggests a coating composition formed of polyester polyol and a block polyisocyanate curing agent.

CITATION LIST

Patent Literature

[PTL 1] Japanese Laid-Open Patent Publication No. 2001-81160
[PTL 2] Japanese Laid-Open Patent Publication No. 2006-169535

SUMMARY OF THE INVENTION

Problems to be Solved by the Invention

However, in a case where an acrylic-modified polyester resin having a high acid value is used as described in Patent Literature 1, processability cannot be sufficiently obtained. Furthermore, there is a problem that an unreacted product of the β-hydroxyalkylamide crosslinking agent remains in a coating film, and curability and retort blushing property are degraded. The coating film obtained by reaction between polyester and block polyisocyanate as described in Patent Literature 2 has a problem that water resistance is poor, and blushing occurs when the contents are sterilized.

An object of the present invention is to provide a polyester resin and a polyester resin composition that can be cured by the polyester resin alone without substantially containing a curing agent, and thus allow reduction of harmful outgas and can form a coating film having excellent characteristics such as curability, retort resistance, and processability.

Solution to the Problems

The inventors of the present invention have found, through various examinations about the foregoing, that a polyester resin composition that contains a polyester resin having a predetermined acid value and that has a predetermined content or more of tetrahydrofuran-insoluble matter when a predetermined heating treatment has been performed, can be cured by the polyester resin alone without substantially using a curing agent. Furthermore, the inventors have found that, when a resin composition is specified and an amount of catalyst is controlled, a polyester resin coating film that has curability and processability in an excellently balanced manner, that allows no harmful outgas to be generated, and that has remarkably enhanced retort resistance can be obtained, and have achieved the present invention. That is, the present invention has the following configurations.

[1] A polyester resin composition comprising polyester resin (A), wherein the polyester resin composition satisfies the following requirements (i) to (iii), (i) the polyester resin (A) has an acid value of 100 eq/ton or more, (ii) the polyester resin composition substantially contains no curing agent, and (iii) a content of tetrahydrofuran-insoluble matter is 10 mass % or more when the polyester resin composition has been heated at 240"C for one hour.

[2] The polyester resin composition according to the above [1], wherein the polyester resin (A) has a branched structure.

[3] The polyester resin composition according to the above [1] or [2], wherein the polyester resin (A) includes, as a polyol component constituting the polyester resin (A), a diol (a) having two primary hydroxy groups and having no alicyclic structure, and, furthermore, one or both of a diol (h) having an alicyclic structure, and a diol (c) having one primary hydroxy group and one secondary hydroxy group and having no Acyclic structure.

[4] The polyester resin composition according to any one of the above [1] to [3], wherein the polyester resin (A) has, as a polycarboxylic acid component constituting the polyester resin (A), at least one selected from the group consisting of adipic acid, 2,6-naphthalene dicarboxylic acid, and 1,4-cyclohexanedicarboxylic acid.

[5] The polyester resin composition according to any one of the above [1] to [4], wherein the polyester resin (A) has unsaturated dicarboxylic acid (d) as a polycarboxylic acid component constituting the polyester resin (A).

[6] The polyester resin composition according to any one of the above [1] to [5], wherein a content of tetrahydrofuran-insoluble matter is smaller than 10 mass % when the polyester resin composition has been heated at 150° C. for 30 minutes, and the polyester resin composition further includes one or more kinds of catalysts (B).

[7] The polyester resin composition according to the above [6], wherein a content of the catalysts (B) is 001 to 0.5 parts by mass with respect to 100 parts by mass of the polyester resin (A).

[8] A polyester resin aqueous dispersion comprising the polyester resin composition according to any one of the above [1] to [7], and an aqueous medium.

[9] A coating composition comprising either the polyester resin composition according to any one of the above [1] to [7], or the polyester resin aqueous dispersion according to the above [8].

[10] A coating film comprising the polyester resin composition according to any one of the above [1] to [7].

[11] A metal can comprising the coating film according to the above [10].

Advantageous Effects of the Invention

The present invention can provide a polyester resin composition that does not generate harmful outgas caused by a curing agent, has curability and processability in an excellently balanced manner, and has remarkably enhanced retort resistance, and a coating film thereof.

DESCRIPTION OF EMBODIMENTS

An embodiment of the present invention will be described below in detail. A polyester resin composition of the present invention contains a polyester resin (A) and satisfies the following requirements (i) to (iii).
<Requirement (i)>
The requirement (i) will be described. The polyester resin (A) needs to have an acid value of 100 eq/ton or more. The acid value is preferably 200 eq/ton or more, more preferably 250 eq/ton or more, and even more preferably 300 eq/ton or more. If the acid value is smaller than the above-described value, the number of carboxyl groups as crosslinking points is small, and curability may thus be degraded. Furthermore, if the acid value is smaller than the above-described value, a thermal decomposition reaction progresses more preferentially than a curing reaction when heating to 240° C. is performed, and processability may thus be degraded. In a case where the acid value has the above-described lower limit value or more, aqueously dispersing operation can be facilitated. The upper limit value of the acid value is, but is not particularly limited to, preferably 1200 eq/ton or smaller in order to reduce an amount of an oligomer or an unreacted product of an acid component during an acid addition reaction.

The acid value of the polyester resin (A) of the present invention can be imparted by any method. Examples of the method for imparting the acid value include a method in which addition reaction of polycarboxylic acid anhydride is performed at the late stage of polycondensation, and a method in which a prepolymer (oligomer) is caused to have a high acid value at the stage of the prepolymer, and polycondensation of the prepolymer is subsequently performed to obtain a polyester resin having the acid value. Since an operation is easy and the target acid value can be easily obtained, the former method in which addition reaction is performed is preferable.

In a compound having a polycarboxylic acid anhydride group in a molecule for imparting the acid value to the polyester resin (A) of the present invention, examples of carboxylic acid monoanhydride include monoanhydrides such as phthalic anhydride, succinic anhydride, maleic anhydride, trimellitic anhydride, itaconic anhydride, citraconic anhydride, and 5-(2,5-dioxotetrahydrofurfuryl)-3-cyclohexene-1,2-dicarboxylic anhydride, hexahydrophthalic anhydride, and tetrahydrophthalic anhydride. One or more of them can be selected and used. Among them, trimellitic anhydride is preferable from the viewpoint of versatility and economical efficiency.

In the compound having a polycarboxylic acid anhydride group in a molecule for imparting the acid value to the polyester resin (A) of the present invention, examples of carboxylic acid polyanhydride include pyromellitic anhydride, 1,2,3,4-butanetetracarboxylic acid dianhydride, 1,2,3,4-pentanetetracarboxylic acid dianhydride, 3,3',4,4'-benzophenonetetracarboxylic acid dianhydride, cyclopentanetetracarboxylic acid dianhydride, 2,3,6,7-naphthalenetetracarboxylic acid dianhydride, 1,2,5,6-naphthalenetetracarboxylic acid dianhydride, ethylene glycol bistrimellitate dianhydride, 2,2',3,3'-diphenyltetracarboxylic acid dianhydride, thiophene-2,3,4,5-tetracarboxylic acid dianhydride, ethylene tetracarboxylic acid dianhydride, 4,4'-oxydiphthalic dianhydride, and 5-(2,5-dioxotetrahydro-3-furanyl)-3-methyl-3-cyclohexene-1,2-dicarboxylic acid anhydride. One or more of them can be selected and used. Among them, ethylene glycol bistrimellitate dianhydride is preferable.

In the compound having a poly carboxylic acid anhydride group in a molecule for imparting the acid value, the carboxylic acid monoanhydride or the carboxylic acid polyanhydride can be used alone, or the carboxylic acid monoanhydride and the carboxylic acid polyanhydride can be used in combination.
<Requirement (ii)>
Requirement (ii) will be described. The polyester resin composition of the present invention substantially contains no curing agent. The "substantially contains no curing agent" means that "a content of a curing agent is smaller than 1 part by mass (in terms of solid content) with respect to 100 parts by mass (in terms of solid content) of the polyester resin (A)".

In the description herein, the curing agent represents a known curing agent that reacts with the polyester resin (A) of the present invention to form a crosslinked structure. The crosslinked structure is, for example, in such a form that unsaturated double bonds in polyester resin are caused to react by radical addition reaction, cation addition reaction, anion addition reaction, or the like, to form an intermolecular carbon-carbon bond, or such a form that an intermolecular bond is formed by condensation reaction, polyaddition reaction, transesterification reaction, or the like of polyvalent carboxylic acid groups and polyhydric alcohol groups in the polyester resin. Examples of the curing agent include phenol resin, amino resin, an isocyanate compound, an epoxy compound, a β-hydroxylamide compound, and a resin containing an unsaturated bond.

In the polyester resin composition of the present invention, a content of the curing agent is smaller than 1 part by mass with respect to 100 parts by mass of the polyester resin (A) (solid content). The content of the curing agent is more preferably smaller than 0.5 parts by mass and even more preferably smaller than 0.1 parts by mass, and the polyester resin composition most preferably contains no curing agent. If the content of the curing agent is larger than a value in the above-described range, economical efficiency may become poor, and, furthermore, processability may be degraded due to self-condensation reaction in the curing agents, a blocking agent is volatilized and harmful outgas such as formaldehyde is generated, and stability for long time storage may be degraded.

<Requirement (iii)>

Requirement (iii) will be described, A content of tetrahydrofuran-insoluble matter needs to be 10 mass % or more when the polyester resin composition of the present invention has been heated at 240° C. for one hour. In a case where the content of tetrahydrofuran (THF)-insoluble matter is 10 mass % or more, the polyester resin composition having retort resistance and processability in an excellently balanced manner, and a coating film thereof can be obtained. The content of Tiff-insoluble matter is preferably 30 mass % or more, more preferably 50 mass % or more, and even more preferably 70 mass %. If the content of the THF-insoluble matter is smaller than 10 mass %, curability may become insufficient and the coating film may have insufficient toughness, and thus, retort resistance may be reduced, and it may be impossible to withstand a forming process on a can after coating is formed on a metal plate.

In the description herein, "a content of tetrahydrofuran-insoluble matter is 10 mass % or more when the polyester resin composition has been heated at 240° C. for one hour" means that the polyester resin composition is applied onto copper foil such that the thickness is 10 μm after being dried, heat is applied at 240° C. for one hour, and a sample having a longitudinal direction of 10 cm and a transverse direction of 2.5 cm is obtained, and the mass of the sample before immersion in THF is defined as (X), and the mass of the sample which has been immersed in 60 ml of THF at 25° C. for one hour, and thereafter dried at 100° C. for 10 minutes, is defined as a mass (Y) after immersion in THF, and a content of the THF-insoluble matter obtained by the following equation is 10 mass % or more.

Content of THF-insoluble matter (mass %)=[{(Y)–mass of copper foil}/{(X)–mass of copper foil}]×100

A content of THF-insoluble matter is preferably smaller than 10 mass % when the polyester resin composition of the present invention has been heated at 150° C. for 30 minutes. The content of THF-insoluble matter is more preferably smaller than 5 mass % and even more preferably smaller than 1 mass %, and there is no problem if the content thereof is 0 mass %. In a case where the content of THF-insoluble matter is smaller than the above-described value under a heating condition of 150° C., which is relatively low temperature, generation of aggregate can be inhibited when the polyester resin composition is dissolved in a solvent or formed into an aqueous dispersion.

In a case where the polyester resin composition of the present invention contains the polyester resin (A) and satisfies the above-described requirements (i) to (iii), the polyester resin composition can be cured by the polyester resin alone without substantially using a curing agent. Therefore, the polyester resin composition of the present invention may be formed merely of the polyester resin (A) without containing a component other than the polyester resin (A).

<Polyester Resin (A)>

Next, the polyester resin (A) of the present invention will be described. The polyester resin (A) of the present invention is mainly formed of a poly carboxylic acid component and a polyol component.

The polyester resin (A) of the present invention preferably includes, as a polyol component, a diol (a) (hereinafter, may be referred to as component (a)) having two primary hydroxy groups and having no alicyclic structure. Examples of the diol (a) having two primary hydroxy groups and having no alicyclic structure in the polyester resin (A) include aliphatic glycols such as ethylene glycol, 1,3-propanediol, 2-butyl-2-ethyl-1,3-propanediol, 2-methyl-1,3-propanediol, neopentyl glycol, 3-methyl-1,5-pentanediol, 1,4-butanediol, 2,4-diethyl-1,5-pentanediol, 1,6-hexanediol, 2-methyl-1,8-octanediol, 3-methyl-1,6-hexanediol, 4-methyl-1,7-heptanediol, 4-methyl-1,8-octanediol, and 1,9-nonanediol, and polyether glycols such as diethylene glycol, triethylene glycol, polyethylene glycol, polypropylene glycol, and polytetramethylene glycol. One or more of them can be selected and used. Among them, ethylene glycol, 2-methyl-1,3-propanediol, and 1,6-hexanediol are preferably used.

A copolymerization ratio of the diol (a) having two primary hydroxy groups and having no alicyclic structure in the polyester resin (A) is preferably 20 to 80 mol %, more preferably 20 to 60 mol %, and even more preferably 20 to 40 mol %, with respect to the entire polyol component. Within the above-described range, curability and retort resistance are preferable.

The polyester resin (A) of the present invention preferably includes, as a polyol component, a diol (b) having an alicyclic structure. In a case where the diol (h) (hereinafter, may be referred to as component (b)) having an alicyclic structure is contained, both processability and retort resistance can be easily achieved. Examples of the diol (b) that constitutes the polyester resin (A) of the present invention and has an alicyclic structure include 1,2-cyclohexanedimethanol, 3-cyclohexanedimethanol, 1,4-cyclohexanedimethanol, tricyclodecane glycols, and hydrogenated bisphenols. One or more of them can be selected and used. Among them, 1,4-cyclohexanedimethanol is preferably used from the viewpoint of curability, processability, and retort resistance.

A copolymerization ratio of the diol (b) that constitutes the polyester resin (A) of the present invention and has an alicyclic structure is preferably 5 to 50 mol %, more preferably 10 to 40 mol %, and even more preferably 20 to 30 mol %, with respect to the entire polyol component. Within the above-described range, processability is preferable.

The polyester resin (A) of the present invention preferably includes, as a polyol component, a diol (c) (hereinafter, may be referred to as component (c)) having one primary hydroxy group and one secondary hydroxy group and having no alicyclic structure. Examples of the diol (c) having one primary hydroxy group and one secondary hydroxy group and having no alicyclic structure in the polyester resin (A) of the present invention include 1,2-propylene glycol and 1,2-butanediol. One or more of them can be selected and used. Among them, 1,2-propylene glycol is preferably used.

A copolymerization ratio of the diol (c) having one primary hydroxy group and one secondary hydroxy group and having no alicyclic structure in the polyester resin (A) of the present invention is preferably 5 to 75 mol %, more preferably 10 to 65 mol %, and even more preferably 15 to 50 mol %, with respect to the entire polyol component. Within the above-described range, curability and retort resistance are preferable.

The polyester resin (A) of the present invention preferably includes, as a polyol component, the component (a), and one or both of the component (b) and the component (c). The component (a) allows an ester bond to be easily formed whereas the component (b) and the component (c) allow an ester bond to be cleaved more easily than the component (a). Therefore, in a case where the component (a), and the component (b) and/or the component (c) are contained, rearrangement and re-bonding of ester bonds are promoted during heating treatment, a content of THF-insoluble matter is increased, and a coating film having both curability and flexibility, i.e., processability, can be estimated to be formed.

Examples of the polycarboxylic acid component constituting the polyester resin (A) of the present invention include aromatic dicarboxylic acid components such as terephthalic acid, isophthalic acid, orthophthalic acid, 2,6-naphthalenedicarboxylic acid, 1,4-naphthalenedicarboxylic acid, and 1,8-naphthalenedicarboxylic acid. One of them may be used alone, or two or more of them may be used in combination. Among them, terephthalic acid and 2,6-naphthalenedicarboxylic acid are preferable.

Examples of another polycarboxylic acid component constituting the polyester resin (A) of the present invention include aliphatic dicarboxylic acid components and alicyclic dicarboxylic acid components. Examples of the aliphatic dicarboxylic acid component include succinic acid, glutaric acid, adipic acid, azelaic acid, sebacic acid, dodecanedioic acid, and dimer acid. Examples of the alicyclic dicarboxylic acid component include 1,4-cyclohexanedicarboxylic acid, tetrahydrophthalic acid, hexahydroisophthalic acid, and 1,2-cyclohexene dicarboxylic acid. One or more of them may be selected and used. Among them, adipic acid and 1,4-cyclohexanedicarboxylic acid are preferable from the viewpoint of reactivity and economical efficiency.

In a case where the polyester resin (A) has the aliphatic dicarboxylic acid component and the Acyclic dicarboxylic acid component as structural units, the copolymerization ratio thereof is preferably 5 to 40 mol % with respect to the polycarboxylic acid component. The copolymerization ratio is more preferably 10 to 30 mol %. Outside the above-described range, a glass transition temperature of the polyester resin (A) is significantly lowered, and retort resistance may be reduced.

As the polycarboxylic acid component constituting the polyester resin (A) of the present invention, an unsaturated dicarboxylic acid (d) is also preferably contained as a structural unit. In a case where the unsaturated dicarboxylic acid (d) is contained, curability can be enhanced through reaction of generating intermolecular carbon-carbon bond by cleavage of an unsaturated bond during heating treatment. Examples of the unsaturated dicarboxylic acid (d) include fumaric acid, maleic acid, itaconic acid, citraconic acid, 2,5-norbornane dicarboxylic acid, tetrahydrophthalic acid, and acid anhydrides thereof. One or more of them can be used.

In a case where the polyester resin (A) has the unsaturated dicarboxylic acid (d) as a structural unit, a copolymerization ratio of the unsaturated dicarboxylic acid (d) is preferably 5 to 20 mol % with respect to the polycarboxylic acid component. The copolymerization ratio is more preferably 10 to 15 mol %. Within the above-described range, both processability and curability can be achieved.

The polyester resin (A) of the present invention preferably has a branched structure. Having a branched structure means that a branched structure is contained in a main chain of polyester. Examples of a method for introducing a branched structure into the polyester resin (A) include a method in which a tri- or higher functional component is copolymerized as a part of the polycarboxylic acid component and/or the polyol component in polycondensation of polyester. Examples of the tri- or higher functional polycarboxylic acid component include trimellitic acid, pyromellitic acid, and benzophenone tetracarboxylic acid. Examples of the tri- or higher functional polyol include glycerin, trimethylolethane, trimethylolpropane, mannitol, sorbitol, pentaerythritol, and α-methyl glucoside. In a case where the polyester resin (A) has a branched structure, a crosslink density is enhanced when rearrangement and re-bonding of ester bonds occur during heating treatment, and thus, the content of THF-insoluble matter is increased, and curability and processability can be enhanced.

A copolymerization ratio of the tri- or higher functional polycarboxylic acid component is preferably 0.1 mol % or more, more preferably 0.5 mol % or more, and even more preferably 1 mol % or more when the entire polycarboxylic acid component is 100 mol %. The copolymerization ratio thereof is preferably 7 mol % or smaller, more preferably 6 mol % or smaller, even more preferably 5 mol % or smaller, and particularly preferably 4 mol % or smaller. The copolymerization ratio of the tri- or higher functional polyol component is preferably 0.1 mol % or more, more preferably 0.5 mol % or more, and even more preferably 1 mol % or more when the entire polyol component is 100 mol %. The copolymerization ratio thereof is preferably 5 mol % or smaller, more preferably 3 mol % or smaller, even more preferably 2 mol % or smaller, and particularly preferably 1 mol % or smaller. If the copolymerization ratio of each of the polycarboxylic acid component and the polyol component is larger than the above-described values, flexibility of the polyester resin is lost, and processability may be degraded or gelation may occur during polymerization of polyester.

For the polycarboxylic acid component and the polyol component constituting the polyester resin (A) of the present invention, a raw material derived from biomass resource can be used. The biomass resource includes, for example, resources stored by converting sunlight energy into the form of starch, cellulose, or the like through photosynthesis of plants, and products obtained by processing bodies of animals that eat plant bodies and grow or processing plant bodies or animal bodies. Among them, the biomass resource is more preferably plant resource, and examples thereof include wood, rice straw, rice hull, rice bran, old rice, maize, sugar cane, cassava, sago palm, soy pulp, corn cob, tapioca meal, bagasse, vegetable oil meal, tubers, buckwheat, soy, fat, waste paper, paper residues, aquatic product residues, livestock excrement, sewage sludge, and food wastes. The biomass resource is even more preferably, maize, sugar cane, cassava, or sago palm.

Next, a method for producing the polyester resin (A) of the present invention will be described. In esterification/transesterification reaction, the entire monomer component and/or a low polymer thereof are heated and melted to react with each other. The temperature of the esterification/trans-esterification reaction is preferably 180 to 250° C. and more preferably 200 to 250° C. The reaction time is preferably 1.5 to 10 hours and more preferably 3 hours to 6 hours. The reaction time is a time from a time when a desired reaction temperature is reached to the succeeding polycondensation reaction. In polycondensation reaction, a polyol component is evaporated from the esterified product obtained by the esterification reaction at a temperature of 220 to 280° C. under a reduced pressure, and the polycondensation reaction is progressed until a desired molecular weight is achieved. The reaction temperature for the polycondensation is preferably 220 to 280° C. and more preferably 240 to 275° C. The degree of pressure reduction is preferably 130 Pa or lower. If the degree of pressure reduction is insufficient, the polycondensation time tends to be long, and it is not preferable. A time of pressure reduction from atmospheric pressure to 130 Pa or lower is preferably 30 to 180 minutes during which the pressure is gradually reduced.

In the esterification/transesterification reaction and the polycondensation reaction, polymerization is performed with use of an organotitanate compound such as tetrabutyl titanate, germanium dioxide, antimony oxide, and an organotin compound such as tin octylate as necessary. The organotitanate compound is preferable from the viewpoint of reaction activity, and germanium dioxide is preferable from the viewpoint of coloring of resin.

The glass transition temperature of the polyester resin (A) of the present invention is preferably 40° C. or higher and more preferably 60° C. or higher from the viewpoint of water resistance, in particular, retort resistance of the coating film. The upper limit of the glass transition temperature is, but is not particularly limited to, 130° C. or lower in general.

The reduced viscosity of the polyester resin (A) of the present invention is preferably 0.2 to 0.6 dl/g and more preferably 0.3 to 0.5 dl/g. If the reduced viscosity is 0.2 dl/g or smaller, curability may become insufficient and the coating film may have insufficient toughness, and thus, it may be impossible to withstand a forming process on a can after coating is formed on a metal plate. Meanwhile, if the reduced viscosity is 0.6 dl/g or larger, a melt viscosity or a solution viscosity may become high and operability may be reduced, and, furthermore, the number of hydroxy group ends is reduced and thus, an acid value may not be sufficiently imparted.

<Catalyst (B)>

Preferably, the polyester resin composition of the present invention further contains a catalyst (B). In a case where the catalyst (B) is contained, self-crosslinkability of the polyester resin (A) during heating treatment thereof is promoted, the content of THF-insoluble matter can be increased, and curability can be enhanced. Examples of the catalyst include acid catalysts such as sulfuric acid, p-toluenesulfonic acid, dodecylbenzenesulfonic acid, naphthalenesulfonic acid, dinonylnaphthalenesulfonic acid, dinonylnaphthalenedis-ulfonic acid, camphorsulfonic acid, and phosphoric acid, products obtained by blocking them by amine (partially neutralized by adding amine), organotin compounds such as dibutyltin dilaurate, titanium compounds such as titanium tetrabutoxide, zinc compounds such as zinc acetate, hafnium compounds such as hafnium chloride·THF complex, and rare earth compounds such as scandium triflate. One of them may be used, or two or more of them may be used in combination. Among them, dodecylbenzenesulfonic acid and a neutralized product thereof are preferable from the viewpoint of compatibility with the polyester resin (A) and from the viewpoint of hygiene.

A blending ratio between the polyester resin (A) and the catalyst (B) in the polyester resin composition of the present invention preferably satisfies (A)/(B)=100/0.0 to 100/0.5 (mass ratio), more preferably satisfies (A)/(B)=100/0.05 to 100/0.4 (mass ratio), and most preferably satisfies (A)/(B) =100/0.1 to 100/0.3 (mass ratio). Within the above-described range, curability of the polyester resin composition can be enhanced.

In the polyester resin composition of the present invention, the catalyst (B) may be contained in the polyester resin (A), or may be added later. From the viewpoint of avoiding gelation during polymerization of the polyester resin (A), the catalyst (B) is preferably added after production of the polyester resin (A).

A radical polymerization inhibitor (C) may be added to the polyester resin composition of the present invention. Although the radical polymerization inhibitor (C) is used mainly for preventing gelation due to cleavage of an unsaturated bond during polymerization of the polyester resin (A), the radical polymerization inhibitor (C) may be added after the polymerization in order to enhance storage stability of the polyester resin (A). Examples of the radical polymerization inhibitor (C) include known ones such as a phenol-based antioxidant, a phosphorus-based antioxidant, an amine-based antioxidant, a sulfur-based antioxidant, and an inorganic compound-based antioxidant.

Examples of the phenol-based antioxidant include 2,5-di-t-butylhydroquinone, 4,4'-butylidenebis(3-methyl-6-t-butylphenol), 1,1,3-tris(2-methyl-4-hydroxy-5-t-butylphe-nyl)butane, 1,3,5-tris-methyl-2,4,6-tris(3,5-di-t-butyl-4-hydroxybenzyl)benzene, tris(3,5-di-t-butyl-4-hydroxyphenyl)isocyanurate, and derivatives thereof.

Examples of the phosphorus-based antioxidant include tri(nonylphenyl) phosphite, triphenyl phosphite, diphenyl isodecyl phosphite, trioctadecyl phosphite, tridecyl phosphite, diphenyldecyl phosphite, 4,4'-butylidene-bis(3-methyl-6-t-butylphenylditridecyl phosphite), distearyl-pentaerythritol diphosphite, trilauryl trithio phosphite, and derivatives thereof.

Examples of the amine-based antioxidant include phenyl-beta-naphthylamine, phenothiazine, N,N'-diphenyl-p-phertylenediamine, N,N'-di-betanaphthyl-p-phenylenedi-amine, N-cyclohexyl-N'-phenyl-p-phenylenediamine, aldol-alpha-naphthylamine, 2,2,4-trimethyl-1,2-dihydroquinoline polymer, and derivatives thereof.

Examples of the sulfur-based antioxidant include thiobis (N-phenyl-beta-naphthylamine, 2-mercaptobenzothiazole, 2-mercaptobenzimidazole, tetramethylthiuram disulfide, nickel isopropyl xanthate, and derivatives thereof.

Examples of a nitro compound-based antioxidant include 1,3,5-trinitrobenzene, p-nitrosodiphenylamine, p-nitrosodi-methylaniline, 1-chloro-3-nitrobenzene, o-dinitrohenzene, m-dinitrobenzene, p-dinitrobenzene, p-nitrobenzoic acid, nitrobenzene, 2-nitro-5-cyanothiophene, and derivatives thereof.

Examples of the inorganic compound-based antioxidant include $FeCl_3$, $Fe(CN)_3$, $CuCl_2$, $CoCl_3$, $Co(ClO_4)_3$, $Co(NO_3)_3$, and $Co_2(SO_4)_3$.

As the radical polymerization inhibitor (C) used in the present invention, the phenol-based antioxidant and the amine-based antioxidant are preferable among the above-described antioxidants from the viewpoint of thermal stability, a radical polymerization inhibitor having a inciting point of 120° C. or higher and a molecular weight of 200 or higher is more preferable, and a radical polymerization inhibitor having a melting point of 170° C. or higher is even more preferable. Specifically, for example, phenothiazine and 4,4'-butylidenebis(3-methyl-6-t-butylphenol) are preferable.

A blending ratio between the polyester resin (A) and the radical polymerization inhibitor (C) in the polyester resin composition of the present invention preferably satisfies (A)/(C)=100/0.001 to 100/0.5 (mass ratio), even more preferably satisfies (A)/(C)=100/0.01 to 100/0.1 (mass ratio), and most preferably satisfies (A)/(C)=100/0.02 to 100/0.08 (mass ratio). Within the above-described range, gelation can be inhibited during production of the polyester resin (A).

In the polyester resin composition of the present invention, according to required characteristics, a known inorganic pigment like titanium oxide and silica, and a known additive such as phosphoric acid and esterified products thereof, a surface smoother, a defoamer, dispersant, and a lubricant can be blended. Particularly, a lubricant is important in order to impart lubricity to a coating film which is required when DI cans, DR (or DRD) cans, and the like are formed. Preferable examples of the lubricant include fatty acid ester wax which is an esterified product of a polyol compound and fatty acid, silicon-based wax, fluorine-based wax, polyolefin wax such as polyethylene, lanoline-based wax, montan wax, and microcrystalline wax. One kind of the lubricant can be used, or two or more kinds of the lubricants can be mixed and used.

The polyester resin composition of the present invention can be formed into a coating material in a state of being dissolved in a known organic solvent. Examples of the organic solvent used for forming the coating material include toluene, xylene, ethyl acetate, butyl acetate, methyl ethyl ketone, methyl isobutyl ketone, cyclohexanone, isophorone, methyl cellosolve, butyl cellosolve, ethylene glycol monoethyl ether acetate, diethylene glycol monoethyl ether acetate, ethylene glycol monoacetate, methanol, ethanol, butanol, ethylene glycol monoethyl ether, ethylene glycol monobutyl ether, diethylene glycol monobutyl ether, and SOLVESSO. One or more of them can be selected and used in consideration of solubility, an evaporation rate, and the like.

The polyester resin composition of the present invention can be formed into a powder coating material by a known pulverizing method. Examples of the known pulverizing method include a grinding method. In the grinding method, the polyester resin composition of the present invention, and, as necessary, a mixture of an anticorrosive pigment and an additive are dry-mixed by a mixer such as a tumbler mixer and a Henschel mixer, and are melt-kneaded by a kneader. Examples of the kneader include standard kneaders such as single-screw or twin-screw extruders, three-rolls, and Labo Plastomill. The kneaded product is cooled and solidified, and the solidified product is roughly ground and finely pulverized, thereby obtaining a pulverized product. Examples of the pulverizing machine include a jet-type pulverizing machine which performs pulverization with use of supersonic jet stream, and an impact-type pulverizing machine which introduces the solidified product into a space formed between a stator (liner) and a rotator (rotor) that rotates at a high speed and performs pulverization. An additive may be further added to the pulverized product as necessary. The pulverized product is subjected to classification to adjust a powder to desired particle size and desired particle size distribution, whereby a powder coating composition can be obtained. For the classification, a known classifier which can remove overpulverized toner base particles through classification by centrifugal force and wind power, can be used. For example, a rotating-type wind power classifier (rotary wind power classifier) can be used.

Another resin can be blended in the polyester resin composition of the present invention for the purpose of modification for, for example, imparting adhesion and flexibility of the coating film. Examples of the other resin include amorphous polyester, crystalline polyester, ethylene-polymerizable unsaturated carboxylic acid copolymer, and ethylene-polymerizable carboxylic acid copolymer ionomer. In a case where at least one kind of resin selected from them is blended, flexibility and/or adhesion can be imparted to the coating film in some cases.

The polyester resin composition of the present invention can be applied to one surface or both surfaces, or, as necessary, end surfaces of any metal plate formed of a metal material that can be used for, for example, drink cans, cans for canned foods, lids thereof, and caps. Examples of the metal material include a tin plate, tin-free steel, and aluminium. The metal plates formed of theses metal materials may be subjected beforehand to phosphoric acid treatment, chromic acid chromate treatment, phosphoric acid chromate treatment, other anticorrosion treatment by an anti-corrosive agent, or surface treatment for enhancing adhesion of the coating film.

The polyester resin composition of the present invention can be applied to the metal plate by a known coating method such as roll coater coating and spray coating, and cured. Although the thickness of the coating film is not particularly limited, the thickness of the film in a dry state is preferably 3 to 18 µm and more preferably 5 to 15 µm. In general, the baking condition for the coating film is such that the baking is performed preferably at a temperature in a range from about 180 to 260° C. for about 10 minutes to about two hours, and more preferably at a temperature in a range from about 200 to 240° C. for about five minutes to about one hour.

<Polyester Resin Aqueous Dispersion>

The polyester resin composition of the present invention can be dispersed in an aqueous medium and can also be used as a polyester resin aqueous dispersion.

As a method for forming the polyester resin (A) used in the present invention as an aqueous dispersion, for example, a method (a) in which the polyester resin (A) is dispersed by dissolving the polyester resin (A) in a water-soluble organic solvent in which the polyester resin (A) is to be dissolved, and sequentially adding a basic compound and water as necessary, or a method (h) in which the polyester resin (A), water, and a water-soluble organic solvent in which the polyester resin (A) is to be dissolved, and, in addition thereto, a basic compound as necessary, are heated to disperse the polyester resin (A), is used. Furthermore, in a case where an amount of the organic solvent is to be reduced, or in a case where an aqueous dispersion is to be formed by fully removing the organic solvent, the organic solvent having a boiling point of 100° C. or lower is used to disperse the polyester resin (A), and the solvent can be thereafter removed through heating or under a reduced pressure. In the case of the polyester resin (A), the former method (a) is preferably used from the viewpoint of film formability.

In this case, the temperature at which the polyester resin (A) is dissolved is preferably 40 to 160° C., more preferably 50 to 140° C., even more preferably 60 to 120° C., and most preferably 70 to 100° C. If the temperature is lower than 40° C., the polyester resin (A) may be insufficiently dissolved, and thus, disentanglement among the molecular chains cannot be sufficiently performed. Meanwhile, if the temperature is higher than 160° C., the polyester resin (A) is highly likely to deteriorate. Examples of an organic solvent in which the polyester resin (A) can be dissolved by being heated at a temperature in a range from 40 to 160° C. include methyl ethyl ketone, dimethylacetamide, dimethylforma- mide, N-methylpyrrolidone, tetrahydrofuran, 1,4-dioxane, 1,3-dioxane, 1,3-dioxolane, 1,2-hexanediol, methyl cello- solve, butyl cellosolve, ethyl carbitol, butyl carbitol, pro- pylene glycol monopropyl ether, propylene glycol monobutyl ether, and triethylene glycol monobutyl ether. Among them, for example, methyl ethyl ketone, butyl cel- losolve, propylene glycol monopropyl ether, and propylene glycol monobutyl ether are preferable.

In a case where the polyester resin (A) has been dissolved at 100° C. or higher, the aqueous dispersion needs to be obtained in a manner in which the temperature of the polyester resin solution is cooled to be 100° C. or lower, and thereafter, water and, as necessary, a basic compound are sequentially added while the resin solution is stirred and phase transition is performed.

As the basic compound used for forming the polyester resin (A) of the present invention as the aqueous dispersion, a compound which volatilizes in a drying or baking process step during formation of the coating film is preferable, and, for example, ammonia and; or an organoamine compound having a boiling point of 250° C. or lower are/is used. Preferable examples of the basic compound include trieth- ylamine, N,N-diethylethanolamine, N,N-dimethyletha- nolamine, aminoethanolamine, N-methyl-N,N-dietha- nolamine, isopropylamine, iminobispropylamine, ethylamine, diethylamine, 3-ethoxypropylamine, 3-diethyl- aminopropylamine, sec-butylamine, propylamine, methyl- aminopropylamine, dimethylaminopropylamine, methyl- iminobispropylamine, 3-methoxypropylamine, monoethanolamine, diethanolamine, triethanolamine, mor- pholine, N-methylmorpholine, and N-ethylmorpholine. An amount of the basic compound is required to be an amount that allows carboxyl groups of the polyester resin (A) to be at least partially neutralized. Specifically, the amount of the basic compound to be added is desirably 0.5 to 1.5 equiva- lent with respect to the carboxyl group equivalent.

The average particle diameter of the polyester resin aqueous dispersion of the present invention exerts a large influence on outer appearance of the coating film and storage stability, and thus, is very important. The average particle diameter is preferably 30 to 250 nm, even more preferably 50 to 200 nm, and particularly preferably 70 to 150 nm. If the average particle diameter is larger than 250 nm, not only dispersion stability is substantially reduced but also the film formability is also degraded, and therefore, the outer appear- ance of the obtained coating is degraded. Meanwhile, the average particle diameter of smaller than 30 nm is not preferable because, although the film formability tends to be significantly enhanced, this is likely to cause fusion or aggregation of dispersed particles, so that increase of vis- cosity or poor dispersion is highly likely to be caused.

The polyester resin aqueous dispersion of the present invention is preferably produced at a resin solid content concentration of 10 to 45 mass %, more preferably 15 to 40 mass %, and even more preferably 20 to 35 mass %. If the resin solid content concentration is larger than 45 mass %, the viscosity of the aqueous dispersion becomes high and resin particles are likely to aggregate, so that the dispersion stability is significantly reduced. Meanwhile, if the resin solid content concentration is smaller than 10 mass %, the polyester resin aqueous dispersion cannot be said to be practical from the viewpoint of both production and usage.

The polyester resin aqueous dispersion of the present invention is optimal as a coating material for the inner surfaces of food cans and drink cans. In order to form a coating material for the inner surfaces of food cans and drink cans, various additives may be blended depending on the purpose. A leveling agent or surfactant for enhancing coat- ability, and smoothness and outer appearance of the coating film, and a lubricant for preventing flaws in the coating film can be blended, and, furthermore, a coloring pigment can be blended, and, depending on cases, polyester resin other than the polyester resin (A), and resin other than polyester resin such as acrylic resin emulsion and polyurethane resin emul- sion can be blended to the extent that the purposes of the present invention such as food sanitation and flavor preserv- ability are not degraded.

The coating material using the polyester resin aqueous dispersion of the present invention can be applied to a can metal base material such as aluminium, stainless steel, or tin plate, by a gravure roll coater, a comma coater, a spray method, or the like. Although the thickness of the film is not particularly limited, the thickness of the film in a dry state is preferably in a range from 3 to 18 μm and more preferably in a range from 5 to 15 μm in general. In general, the baking condition for the coating film is such that the baking is performed preferably at a temperature in a range from about 180 to 260° C. for about ten minutes to about two hours and more preferably at a temperature in a range from about 200 to 240° C. for about five minutes to about one hour.

EXAMPLES

Hereinafter, the present invention will be described in more detail by means of examples. However, the present invention is not limited to these examples. Various charac- teristics are evaluated according to the following methods. "Parts" indicates parts by mass, and "%" indicates mass %.
<Polyester Resin (A)>
(1) Measurement of Resin Composition A sample of the polyester resin (A) was dissolved in deuterated chloroform, and 1H-NMR analysis was per- formed by using a nuclear magnetic resonance (NMR) device 400-MR manufactured by VARIAN. The molar ratio was obtained from the obtained integration value ratio.
(2) Measurement of Reduced Viscosity (Unit: dl/g)

In 25 cc of a mixture solvent of phenol/tetrachloroethane (mass ratio of 6/4), 0.1 g of the sample of the polyester resin (A) was dissolved and measurement was performed at 30° C.
(3) Measurement of Glass Transition Temperature (Tg)

The glass transition temperature was measured by a differential scanning calorimeter (manufactured by SU, DSC-200). In a snap-in-lid-type aluminium container, 5 mg of the sample of the polyester resin (A) was placed and sealed, and cooled to −50° C. by using liquid nitrogen. Subsequently, the temperature was increased to 150° C. at 20° C./minute. In the endothermic curve obtained in this process, the temperature at the intersection of a baseline before appearance of an endothermic peak and a tangent toward the endothermic peak was determined as the glass transition temperature (Tg, unit: ° C.).
(4) Measurement of Acid Value In 40 ml of chloroform, 0.2 g of the sample of the polyester resin (A) was dissolved, and the obtained product was subjected to titration by using 0.01 N potassium hydrox- ide ethanol solution, and an equivalent (eq/ton) per $10^6$ g of the polyester resin was obtained. Phenolphthalein was used as an indicator.

<Production of Polyester Resin Composition>

At cyclohexanone/SOLVESSO-150=1/1 (mass ratio), 100 parts Icy mass (solid content) of the polyester resin (A) was dissolved so as to obtain a viscosity suitable for coating. The polyester resin composition (solid content of about 35 mass %) was obtained according to blending indicated in Table 2 and Table 3.

(5) Measurement of Content of THF-Insoluble Matter

The polyester resin composition was applied onto copper foil such that the thickness was 10 μm after being dried, heat was applied at 240° C. for one hour, and a sample having a longitudinal direction of 10 cm and a transverse direction of 2.5 cm was obtained, and the mass of the sample before immersion in THF was defined as (X), and the mass of the sample which was immersed in 60 nil of THF at 25° C. for one hour, and thereafter dried at 100° C. for 10 minutes, was defined as a mass (Y) after immersion in THF, and a content of THF-insoluble matter obtained when the polyester resin composition was heated at 240° C. for one hour was calculated by the following equation.

$$\text{Content of THF-insoluble matter (mass \%)}=[\{(Y)-\text{mass of copper foil}\}/\{(X)-\text{mass of copper foil}\}]\times100$$

Furthermore, a content of THF-insoluble matter in the case of the polyester resin composition being heated at 150° C. fir 30 minutes was obtained in the same manner as described above except that heating was performed at a temperature of 150° C. for 30 minutes.

<Production of Test Piece>

The polyester resin composition was applied to one surface of a tin plate (MS G 3303(2008) SPTE, 70 min/150 mm×0.3 mm) with a bar coater such that the thickness of the film was 10±2 μm after drying, and curing by baking was performed under a baking condition of 240° C. (PMT: peak base material temperature)×1 hour, and the obtained product was used as a test piece (hereinafter, referred to as test piece).

(6) Evaluation of Processability

The thus-obtained test piece was bent by 180° in such a direction that the cured film was on the outer side, and the electrical current value was measured at a crack generated at the bent portion in the cured film, thereby evaluating processability. The test piece was bent by interposing no object (so-called 0T). Sponge (width of 20 mm, depth of 50 mm, thickness of 10 mm) immersed in 1% NaCl aqueous solution was prepared so as to be placed on an aluminium plate electrode (width of 20 mm, depth of 50 mm, thickness of 0.5 mm), and the bent portion of the test piece was brought into contact with the sponge near the center portion of the bent portion so as to be parallel to the 20 mm side of the sponge. DC voltage of 5.0 V was applied across the aluminium plate electrode and a non-coated portion of the back surface of the test plate, and the electrical current value was measured. The smaller electrical current value indicates better betiding characteristic.

(Criteria)

A: smaller than 0.5 mA

B: 0.5 mA or more and smaller than 1.0 mA

C: 1.0 mA or more and smaller than 2.0 mA

D: 2.0 mA or more (7) Evaluation of Curability

Gauze felt immersed in methyl ethyl ketone was pressed against the cured film face of the test piece such that the contact area was 1 cm2, and a 500 g load was applied to perform a rubbing test. The number of times (one reciprocation was one time) before the cured film was peeled off was evaluated according to the following criteria.

(Criteria)

A: The coating film was not peeled off even when the number of times was 50 or more, and no change was found in the cured film.

B: The cured film was peeled off when the number of times was 25 to 49, and the tin plate was exposed.

C: The cured film was peeled off when the number of times was 16 to 24, and the tin plate was exposed.

D: The cured film was peeled off when the number of times was 15 or smaller, and the tin plate was exposed.

(8) Evaluation of Retort Resistance

The test piece was placed so as to be stood in a stainless steel cup, ion-exchanged water was poured into the cup until the height of the water reached half the height of the test piece, and the obtained product was set in an autoclave of a retort testing machine (manufactured by TONEY KOGYO CO., LTD., ES-315), and was subjected to retort treatment at 125° C.×30 minutes. Evaluation after the treatment was performed at a portion with which vapor came into contact and at which the cured film was likely to be subjected to more severe conditions in general, and blushing and blister of the cured film were visually determined as follows.

(Criteria)

A: Good (no blushing and no blister occurred.)

B: Blushing slightly occurred and no blister occurred.

C: Some blushing and/or some blisters occurred.

D: Remarkable blushing and/or remarkable blister occurred.

Synthetic Example (a) of Polyester Resin (A)

In a 3 L four-necked flask. 740 parts by mass of dimethyl terephthalate, 100 parts by mass of dimethyl 2,6-naphthalenedicarboxylate, 8 parts by mass of trimellitic anhydride, 190 parts by mass of ethylene glycol, 330 parts by mass of 1,2-propanediol, 190 parts by mass of 1,4-cyclohexanedimethanol, and 0.4 parts by mass of tetra-n-butyl titanate (hereinafter, may be abbreviated as TBT) as a catalyst (0.03 mol % with respect to the entire acid component) were put, and the temperature was gradually increased to 230° C. over three hours, to perform esterification. Subsequently, the pressure in the system was gradually reduced, polymerization under the reduced pressure was performed over one hour to 10 mmHg, the temperature was increased to 250° C., and late-stage polymerization was further performed under vacuum of 1 mmHg or lower for 50 minutes. When the target molecular weight was reached, the obtained product was cooled to 210° C. in a nitrogen atmosphere. Subsequently, 26 parts by mass of trimellitic anhydride was put, and the obtained product was continuously stirred at 200 to 230° C. in a nitrogen atmosphere for 30 minutes. The obtained product was taken out and the polyester resin (synthetic example (a)) was obtained. The obtained polyester resin had a reduced viscosity of 0.33 dl/g, a glass transition temperature (Tg) of 65° C., and an acid value of 300 eq/t.

Synthetic Examples (b) to (t)

Polyester resins (synthetic examples (b) to (t)) having resin compositions as indicated in Table 1 were each produced by a direct polymerization method similar to that of the synthetic example (a), except that the composition to be put was changed.

TABLE 1

| Synthetic example | | | a | b | c | d | e | f | g |
|---|---|---|---|---|---|---|---|---|---|
| Resin composition | Polycarboxylic acid component (mol %) | Terephthalic acid | 79 | 79 | 79 | 69 | 79 | 80 | 79 |
| | | 2,6-naphthalenedicarboxylic acid | 10 | 10 | 10 | 10 | | 10 | 10 |
| | | Orthophthalic acid | | | | 10 | | | |
| | | Adipic acid | | | | | 10 | | |
| | | Fumaric acid | 10 | 10 | 10 | 10 | 10 | 10 | 10 |
| | | Trimellitic anhydride | 1 | 1 | 1 | 1 | 1 | | 1 |
| | | Trimellitic anhydride (added later) | 3 | 3 | 1 | 3 | 3 | 3 | 3 |
| | Polyol component (mol %) | Ethylene glycol | 35 | 35 | 35 | 70 | | | 35 |
| | | 1,6-hexanediol | | | | | 30 | 40 | |
| | | Neopentyl glycol | | | | | | | |
| | | 1,2-propylene glycol | 35 | 35 | 35 | | 40 | 59 | 35 |
| | | 1,4-cyclohexanedimethanol | 30 | 30 | 30 | 30 | 30 | | |
| | | Tricyclodecane dimethanol | | | | | | | 30 |
| | | Trimethylolpropane | | | | | | 1 | |
| Resin characteristics | | Reduced viscosity (dl/g) | 0.33 | 0.35 | 0.33 | 0.35 | 0.60 | 0.35 | 0.35 |
| | | Acid value (eq/ton) | 300 | 300 | 120 | 290 | 300 | 300 | 310 |
| | | Tg (° C.) | 65 | 65 | 65 | 60 | 45 | 40 | 78 |

| Synthetic example | | | h | i | j | k | l | m | n |
|---|---|---|---|---|---|---|---|---|---|
| Resin composition | Polycarboxylic acid component (mol %) | Terephthalic acid | 79 | 79 | 79 | 79 | 79 | 80 | 89 |
| | | 2,6-naphthalenedicarboxylic acid | 10 | 10 | 10 | 10 | 10 | 10 | 10 |
| | | Orthophthalic acid | | | | | | | |
| | | Adipic acid | | | | | | | |
| | | Fumaric acid | 10 | 10 | 10 | 10 | 10 | 10 | |
| | | Trimellitic anhydride | 1 | 1 | 1 | 1 | 1 | | 1 |
| | | Trimellitic anhydride (added later) | 3 | 3 | 3 | 3 | 3 | 3 | 3 |
| | Polyol component (mol %) | Ethylene glycol | 80 | 50 | 20 | 80 | 25 | 35 | 35 |
| | | 1,6-hexanediol | | | | | | | |
| | | Neopentyl glycol | | | | | | | |
| | | 1,2-propylene glycol | 20 | | 30 | | 75 | 35 | 35 |
| | | 1,4-cyclohexanedimethanol | | 50 | 50 | 20 | | 30 | 30 |
| | | Tricyclodecane dimethanol | | | | | | | |
| | | Trimethylolpropane | | | | | | | |
| Resin characteristics | | Reduced viscosity (dl/g) | 0.45 | 0.28 | 0.30 | 0.30 | 0.30 | 0.35 | 0.30 |
| | | Acid value (eq/ton) | 280 | 320 | 320 | 320 | 320 | 300 | 300 |
| | | Tg (° C.) | 60 | 80 | 80 | 70 | 85 | 65 | 75 |

| Synthetic example | | | o | p | q | r | s | t |
|---|---|---|---|---|---|---|---|---|
| Resin composition | Polycarboxylic acid component (mol %) | Terephthalic acid | 49 | 79 | 79 | 79 | 79 | 79 |
| | | 2,6-naphthalenedicarboxylic acid | 50 | 10 | 10 | 10 | 10 | 10 |
| | | Orthophthalic acid | | | | | | |
| | | Adipic acid | | | | | | |
| | | Fumaric acid | | | 10 | 10 | 10 | 10 |
| | | Trimellitic anhydride | 1 | 1 | 1 | 1 | 1 | 1 |
| | | Trimellitic anhydride (added later) | 1 | 3 | 3 | 0.8 | 0.6 | 3 |
| | Polyol component (mol %) | Ethylene glycol | 50 | 50 | | 35 | 35 | 30 |
| | | 1,6-hexanediol | | | | | | |
| | | Neopentyl glycol | | 50 | | | | |
| | | 1,2-propylene glycol | | | 70 | 35 | 35 | 40 |
| | | 1,4-cyclohexanedimethanol | 50 | | 30 | 30 | 30 | 30 |
| | | Tricyclodecane dimethanol | | | | | | |
| | | Trimethylolpropane | | | | | | |
| Resin characteristics | | Reduced viscosity (dl/g) | 0.30 | 0.40 | 0.30 | 0.33 | 0.33 | 0.25 |
| | | Acid value (eq/ton) | 120 | 300 | 300 | 90 | 70 | 280 |
| | | Tg (° C.) | 95 | 60 | 90 | 65 | 65 | 65 |

A polyester resin composition was produced by using the obtained polyester resin, and processability, curability, and retort resistance were evaluated. The blending for the polyester resin compositions, and the evaluation results are indicated in Table 2 and Table 3.

TABLE 2

| | | Item | Example | | | | | | | | |
|---|---|---|---|---|---|---|---|---|---|---|---|
| | | | 1 | 2 | 3 | 4 | 5 | 6 | 7 | 8 | 9 |
| Polyester resin composition (solid content mass ratio) | Resin | Polyester resin | a | b | c | d | e | f | g | h | i |
| | | | 100 | 100 | 100 | 100 | 100 | 100 | 100 | 100 | 100 |
| | Catalyst | Dodecylbenzenesulfonic acid | | 0.3 | 0.3 | 0.3 | 0.3 | 0.3 | 0.3 | 0.3 | 0.3 |

TABLE 2-continued

| | | | | | | | Example | | | | |
|---|---|---|---|---|---|---|---|---|---|---|---|
| Evaluation | Content of THF-insoluble matter (mass %) <240° C. for one hour> | 70 | 90 | 60 | 90 | 90 | 80 | 90 | 80 | 80 |
| | Content of THF-insoluble matter (mass %) <150° C. for 30 minutes> | 0 | 0 | 0 | 0 | 0 | 0 | 0 | 0 | 0 |
| | Processability | A | A | A | A | A | A | A | A | A |
| | Curability | A | A | B | A | A | A | A | A | A |
| | Retort resistance | B | A | B | A | A | A | A | A | A |

| | | | | | | | Example | | | | |
|---|---|---|---|---|---|---|---|---|---|---|---|
| | | Item | 10 | 11 | 12 | 13 | 14 | 15 | 16 | 17 |
| Polyester resin composition (solid content mass ratio) | Resin | Polyester resin | j 100 | k 100 | l 100 | m 100 | n 100 | o 100 | p 100 | q 100 |
| | Catalyst | Dodecylbenzenesulfonic acid | 0.3 | 0.3 | 0.3 | | | | | |
| Evaluation | | Content of THF-insoluble matter (mass %) <240° C. for one hour> | 80 | 80 | 80 | 60 | 45 | 20 | 45 | 10 |
| | | Content of THF-insoluble matter (mass %) <150° C. for 30 minutes> | 0 | 0 | 0 | 0 | 0 | 0 | 0 | 0 |
| | | Processability | A | A | A | B | B | C | B | C |
| | | Curability | A | A | A | B | B | B | B | B |
| | | Retort resistance | A | A | A | C | C | B | C | C |

TABLE 3

| | | | Comparative Example | | |
|---|---|---|---|---|---|
| | | Item | 1 | 2 | 3 |
| Polyester resin composition (solid content mass ratio) | Resin | Polyester resin | r 100 | s 100 | t 100 |
| | Catalyst | Dodecylbenzenesulfonic acid | | | |
| | Curing agent | PR-521 (X) | | | 5 |
| Evaluation | | Content of THF-insoluble matter (mass %) <240° C. for one hour> | 7 | 3 | 80 |
| | | Content of THF-insoluble matter (mass %) <150° C. for 30 minutes> | 0 | 0 | 0 |
| | | Processability | D | D | D |
| | | Curability | D | D | C |
| | | Retort resistance | D | D | C |

(X) PR-521: phenol resin curing agent (PHENODUR PR-521 manufactured by Allnex)

As is apparent from Table 2, the cured film (coating film) obtained from the polyester resin composition using the polyester resin (A) of the present invention was excellent in all of processability, curability, and retort resistance. Meanwhile, as shown in Table 3, in Comparative Examples 1 and 2, since the acid value of the polyester resin is low, curability was insufficient, and processability and retort resistance were also inferior. In Comparative Example 3, curing agent was blended, resulting in inferior processability.

INDUSTRIAL APPLICABILITY

The product of the present invention is the polyester resin composition having excellent processability, curability, and retort resistance, the polyester resin aqueous dispersion, the coating material containing the same, and the coating film containing the same, and is suitable as a main component of a coating material which is applied to, for example, metal cans for foods and drinks.

The invention claimed is:

1. A polyester resin composition comprising a polyester resin (A) and one or more kinds of catalysts (B), wherein the polyester resin composition satisfies the following requirements (i) to (iv), (i) the polyester resin (A) has an acid value of 100 eq/ton or more, (ii) in terms of solid content, a content of a curing agent is smaller than 1 part by mass with respect to 100 parts by mass of the polyester resin (A), (iii) a content of tetrahydrofuran-insoluble matter obtained by the following equation when the polyester resin composition has been heated at 240° C. for one hour is 10 mass % or more:

Content of tetrahydrofuran-insoluble matter (mass %)=[{($Y$)−mass of copper foil}/{($X$)−mass of copper foil}]×100, wherein the polyester resin composition is applied onto a copper foil such that the thickness is 10 μm after being dried, heat is applied at 240° C. for one hour, and a sample having a longitudinal direction of 10 cm and a transverse direction of 2.5 cm is obtained, and a mass of the sample before immersion in tetrahydrofuran is defined as ($X$), and a mass of the sample which has been immersed in 60 ml of tetrahydrofuran at 25° C. for one hour, and thereafter dried at 100° C. for 10 minutes, is defined as ($Y$) after immersion in tetrahydrofuran, and (iv) a content of the one or more kinds of catalysts (B) is 0.01 to 0.5 parts by mass with respect to 100 parts by mass of the polyester resin (A).

2. The polyester resin composition according to claim 1, wherein the polyester resin (A) has a branched structure.

3. The polyester resin composition according to claim 1, wherein the polyester resin (A) includes, as a polyol component constituting the polyester resin (A), a diol (a) having two primary hydroxy groups and having no alicyclic structure, and, furthermore, one or both of a diol (b) having an alicyclic structure, and a diol (c) having one primary hydroxy group and one secondary hydroxy group and having no alicyclic structure.

4. The polyester resin composition according to claim 1, wherein the polyester resin (A) has, as a polycarboxylic acid component constituting the polyester resin (A), at least one selected from the group consisting of adipic acid, 2,6-naphthalene dicarboxylic acid, and 1,4-cyclohexanedicarboxylic acid.

5. The polyester resin composition according to claim 1, wherein a content of tetrahydrofuran-insoluble matter is smaller than 10 mass % when the polyester resin composition has been heated at 150° C. for 30 minutes.

6. A polyester resin aqueous dispersion comprising the polyester resin composition according to claim 1, and an aqueous medium.

7. A coating composition comprising the polyester resin composition according to claim 1.

8. A coating film comprising the polyester resin composition according to claim 1.

9. The polyester resin composition according to claim 1, wherein the content of tetrahydrofuran-insoluble matter is 30 mass % or more when the polyester resin composition has been heated at 240° C. for one hour.

10. The polyester resin composition according to claim 1, wherein the content of tetrahydrofuran-insoluble matter is 50 mass % or more when the polyester resin composition has been heated at 240° C. for one hour.

11. The polyester resin composition according to claim 1, wherein the content of the one or more kinds of catalysts (B) is 0.05 to 0.4 parts by mass with respect to 100 parts by mass of the polyester resin (A).

12. The polyester resin composition according to claim 1, wherein the polyester resin composition does not include carboxylic acid polyanhydride.

13. The polyester resin composition according to claim 1, wherein the polyester resin (A) has unsaturated dicarboxylic acid (d) as a polycarboxylic acid component constituting the polyester resin (A).

14. The polyester resin composition according to claim 13, wherein a copolymerization ratio of the unsaturated dicarboxylic acid (d) is 5 to 20 mol % with respect to the polycarboxylic acid component.

15. The polyester resin composition according to claim 14, wherein the content of tetrahydrofuran-insoluble matter is 50 mass % or more when the polyester resin composition has been heated at 240° C. for one hour.

16. A metal can comprising the coating film according to claim 8.

17. A coating composition comprising the polyester resin aqueous dispersion according to claim 6.

\* \* \* \* \*